United States Patent
Berezhnyy

(10) Patent No.: US 12,326,394 B2
(45) Date of Patent: Jun. 10, 2025

(54) PARTICLES CHARACTERIZATION IN FLOW CYTOMETRY

(71) Applicant: Beckman Coulter, Inc., Brea, CA (US)

(72) Inventor: Ihor Berezhnyy, San Jose, CA (US)

(73) Assignee: Beckman Coulter, Inc., Brea, CA (US)

( * ) Notice: Subject to any disclaimer, the term of this patent is extended or adjusted under 35 U.S.C. 154(b) by 0 days.

(21) Appl. No.: 18/880,001

(22) PCT Filed: May 3, 2024

(86) PCT No.: PCT/US2024/027828
§ 371 (c)(1),
(2) Date: Dec. 30, 2024

(87) PCT Pub. No.: WO2024/238175
PCT Pub. Date: Nov. 21, 2024

(65) Prior Publication Data
US 2025/0164379 A1 May 22, 2025

Related U.S. Application Data

(60) Provisional application No. 63/501,943, filed on May 12, 2023.

(51) Int. Cl.
*G01N 15/1434* (2024.01)
*G01N 15/149* (2024.01)
*G01N 15/10* (2006.01)

(52) U.S. Cl.
CPC ....... *G01N 15/1434* (2013.01); *G01N 15/149* (2024.01); *G01N 2015/1006* (2013.01)

(58) Field of Classification Search
CPC ............. G01N 15/1434; G01N 15/149; G01N 2015/1006
See application file for complete search history.

(56) References Cited

U.S. PATENT DOCUMENTS

2014/0242633 A1* 8/2014 Fukuda .............. G01N 33/5094 435/39
2017/0227447 A1* 8/2017 Degeal ............... G01N 15/1404

FOREIGN PATENT DOCUMENTS

EP 1865303 A1 12/2007

OTHER PUBLICATIONS

Nick A. Zilmer et al.,"Flow Cytometric Analysis Using Digital Signal Processing", Cytometry, vol. 20, No. 2: 102-117 (1995).
International Search Report and Written Opinion for PCT/US2024/027828 (Aug. 5, 2024).

* cited by examiner

*Primary Examiner* — Roy M Punnoose
(74) *Attorney, Agent, or Firm* — Merchant & Gould P.C.

(57) ABSTRACT

A method of characterizing particles in flow cytometry includes determining a first pulse width value of a particle using a first technique. The method includes determining a second pulse width value of the particle using a second technique. The method further includes comparing the first and second pulse width values, and characterizing the particle as a concatenated particle when a difference between the first and second pulse width values exceeds a threshold.

15 Claims, 16 Drawing Sheets

PARTICLES CHARACTERIZATION IN FLOW CYTOMETRY

CROSS-REFERENCE TO RELATED APPLICATION

This application is a U.S. National Stage Application of PCT International Application No. PCT/US2024/027828, filed on May 3, 2024, which claims the benefit of and priority to U.S. Provisional Application No. 63/501,943, filed May 12, 2023; the entire disclosures of which are incorporated by reference in their entireties. To the extent appropriate, a claim of priority is made to each of the above-disclosed applications.

BACKGROUND

In flow cytometry, particles are arranged in a sample stream to pass in a single file line through one or more excitation light beams. Light that is scattered and/or emitted by the particles from interaction with the one or more excitation light beams is collected and analyzed to characterize and differentiate the particles. In a sorting flow cytometer, particles may be extracted out of the sample stream after having been characterized by their interaction with the one or more excitation beams, and thereby sorted into different groups.

Doublets occur when two cells pass through the one or more excitation light beams at the same time. Typically, doublets and other types of concatenated cells (e.g., triplets, quadruplets, and the like) are excluded from analysis in flow cytometry because they affect the quality of data such as by causing false positives and/or false negatives in the data.

SUMMARY

In general terms, the present disclosure relates to characterizing particles in flow cytometry. In one possible configuration, the particles are characterized to distinguish singlets from other types of particles based on a difference between first and second pulse width values that are calculated using different techniques. Various aspects are described in this disclosure, which include, but are not limited to, the following aspects.

One aspect relates to a method of characterizing particles in flow cytometry, the method comprising: determining a first pulse width value of a particle using a first technique; determining a second pulse width value of the particle using a second technique; comparing the first and second pulse width values; and characterizing the particle as a concatenated particle when a difference between the first and second pulse width values exceeds a threshold.

Another aspect relates to system for characterizing particles, the system comprising: a light emitting unit generating one or more excitation light beams; a fluidic system streaming the particles through the one or more excitation light beams at an interrogation zone; optical elements directing scattered light from the interrogation zone; one or more detectors measuring characteristics of the scattered light; and a processing circuitry having non-transitory computer readable storage media storing instructions which, when executed by the processing circuitry, cause the processing circuitry to: determine first pulse width values of the particles using a first technique; determine second pulse width values of the particles using a second technique; compare the first and second pulse width values; and characterize the particles as concatenated particles when a difference between the first and second pulse width values exceeds a threshold.

Another aspect relates to a method of characterizing a particle in flow cytometry, the method comprising: obtaining a waveform of the particle; determining a mean value of a baseline on both sides of the waveform of the particle; subtracting the mean value from data points of the waveform; determining a maximum value of the waveform; calculating a half maximum value by dividing the maximum value by two; subtracting the half maximum value from the data points of the waveform; obtaining absolute values for the data points to generate a folded waveform; determining a first minimum and a last minimum in the folded waveform; generating a first vector by performing linear regression on a first set of data points in proximity to the first minimum; generating a second vector by performing linear regression on a second set of data points in proximity to the last minimum; and measuring a direct pulse width value of the particle as a distance between the first and second vectors at the half maximum value.

A variety of additional aspects will be set forth in the description that follows. The aspects can relate to individual features and to combination of features. It is to be understood that both the foregoing general description and the following detailed description are exemplary and explanatory only and are not restrictive of the broad inventive concepts upon which the embodiments disclosed herein are based.

DESCRIPTION OF THE FIGURES

The following drawing figures, which form a part of this application, are illustrative of the described technology and are not meant to limit the scope of the disclosure in any manner.

DETAILED DESCRIPTION

Figure 1:
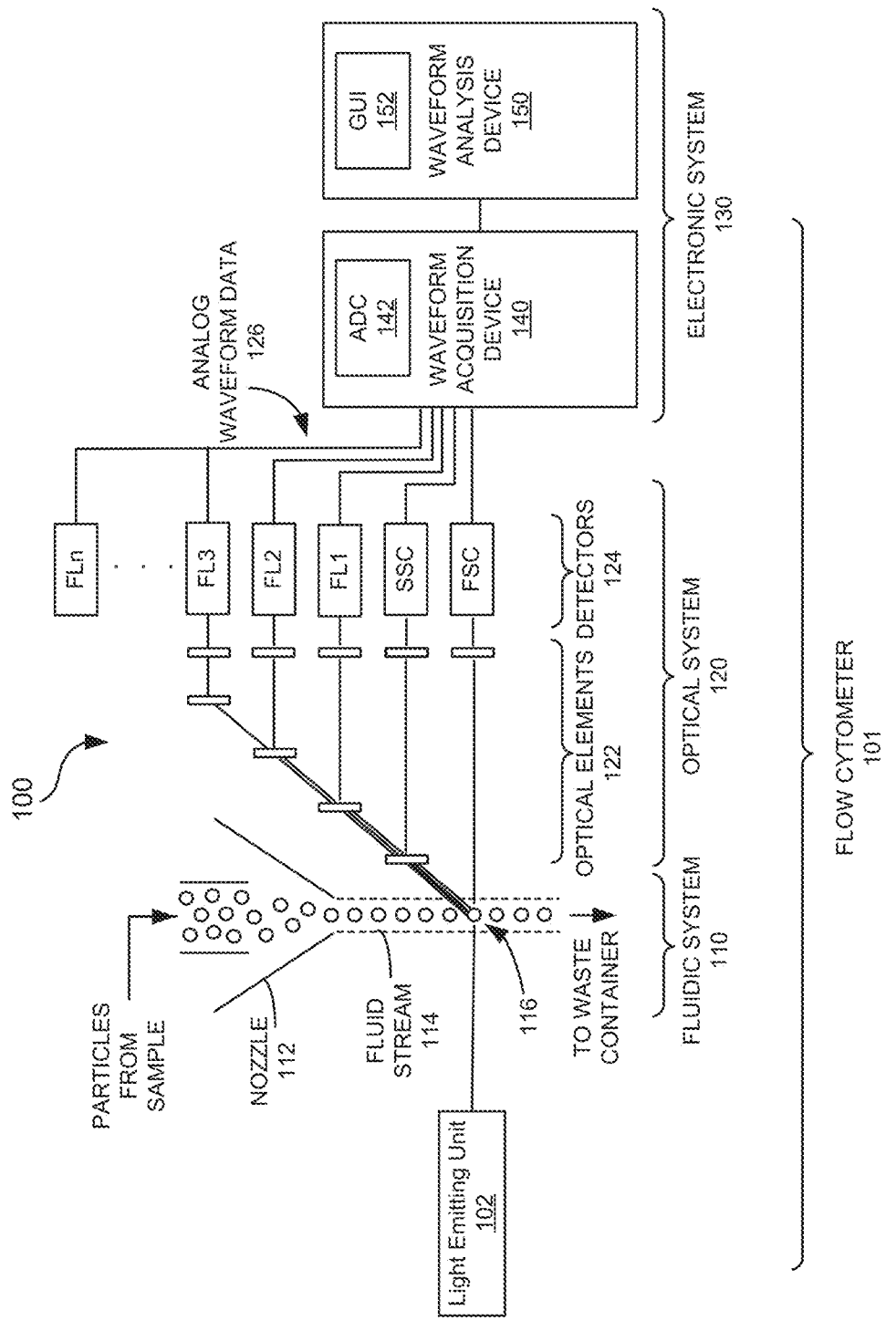
FIG. 1 schematically illustrates an example of a flow cytometer system.

Various embodiments will be described in detail with reference to the drawings, where like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 schematically illustrates an example of a flow cytometer system 100. In general, flow cytometry is a technique for measuring and analyzing properties of particles or cells when flowing in a fluid stream. Data from millions of particles or cells can be collected by the flow cytometer system 100 in a matter of minutes and displayed in a variety of formats. Illustrative example applications of flow cytometry include phenotyping to identify and count specific cell types within a population, analyzing DNA or RNA content within cells, determining presence of antigens on a surface or within cells, and assessing cell health status.

As shown in the illustrative example of FIG. 1, the flow cytometer system 100 generally includes three main component subsystems: a fluidic system 110, an optical system 120, and an electronic system 130. The fluidic system 110 includes a nozzle 112 which receives a sample containing particles or cells suspended in a fluid. The nozzle 112 creates a fluid stream 114 of the particles or cells arranged in a single file line. Each particle or cell passes through one or more light excitation beams produced by a light emitting unit 102. The particles or cells intersect with the one or more light excitation beams at an interrogation zone 116. In some examples, the light emitting unit 102 includes one or more light-emitting diodes (LEDs). In further examples, the light emitting unit 102 includes one or more lasers.

The optical system 120 includes the light emitting unit 102, optical elements 122, and detectors 124. At the interrogation zone 116, light from the light emitting unit 102 hits the particles or cells in the fluid stream 114 and scatters. The optical elements 122 direct the scattered light toward the detectors 124. The detectors 124 can include a forward scatter (FSC) detector to measure scatter in the path of the light emitting unit 102, a side scatter (SSC) detector to measure scatter at a ninety-degree angle relative to the light emitting unit 102, one or more fluorescence detectors (FL1, FL2, FL3 . . . FLn) to measure the emitted fluorescence intensity at different wavelengths of light, and additional types of detectors.

Generally, FSC intensity is proportional to the size or diameter of a particle due to light diffraction around the particle. FSC may therefore be used for the discrimination of particles by size. SSC, on the other hand, is produced from light refracted or reflected by internal structures of the particle and may therefore provide information about the internal complexity or granularity of the particle. By adding fluorescent labelling to a sample, different fluorescent signals/channels (e.g., green, orange, and red) can be analyzed for functional characteristics of a cell. For example, since T-cells present CD3 binding sites, a sample containing T-cells may be "stained" with anti-CD3 antibodies conjugated with a fluorescent molecule. As these cells pass through the interrogation zone 116 in a single file line, the light from the source light excites the fluorescent tag, or fluorochrome, to emit photons at a wavelength detectable by a fluorescence detector. The detectors 124 may therefore simultaneously measure several parameters and enable categorization of particles by their function based on detected wavelengths of light.

The electronic system 130 includes a waveform acquisition device 140 and a waveform analysis device 150. The waveform acquisition device 140 is communicatively coupled with the detectors 124 to receive analog waveform data 126 generated by the detectors 124. The waveform acquisition device 140 includes an analog-to-digital converter (ADC) 142 that is configured to digitize the analog waveform data 126 received from the detectors 124.

The waveform analysis device 150 is configured to receive the digital waveform data for processing and analysis. The waveform analysis device 150 can display the digital waveform data and analyses thereof on a graphical user interface (GUI) 152 for a user of the flow cytometer system 100. In some examples, the waveform analysis device 150 includes a computing device 1600 communicatively coupled with a flow cytometer 101 such as through a wired or wireless connection. In some examples, the computing device 1600 can be communicatively coupled with the flow cytometer 101 over a network such as a local area network (LAN) using Ethernet or Wi-Fi, or over a wide area network (WAN) such as the Internet. The flow cytometer 101 may include the fluidic system 110, optical system 120, and the waveform acquisition device 140, but not the waveform analysis device 150. In alternative embodiments, the waveform analysis device 150 is integrated with the flow cytometer 101.

The flow cytometer system 100 includes elements which are shown and described for purposes of discussion, and it will be appreciated that numerous variations in components and functions are possible. The optical elements 122 may include a series of filters, dichroic mirrors, and/or beam splitters to select out different wavelengths of light and provide the wavelength to the appropriate detector. The detectors 124 may comprise, for example, photomultiplier tubes (PMTs) or avalanche photodiodes (APDs) or single photon counting devices.

Figure 2:
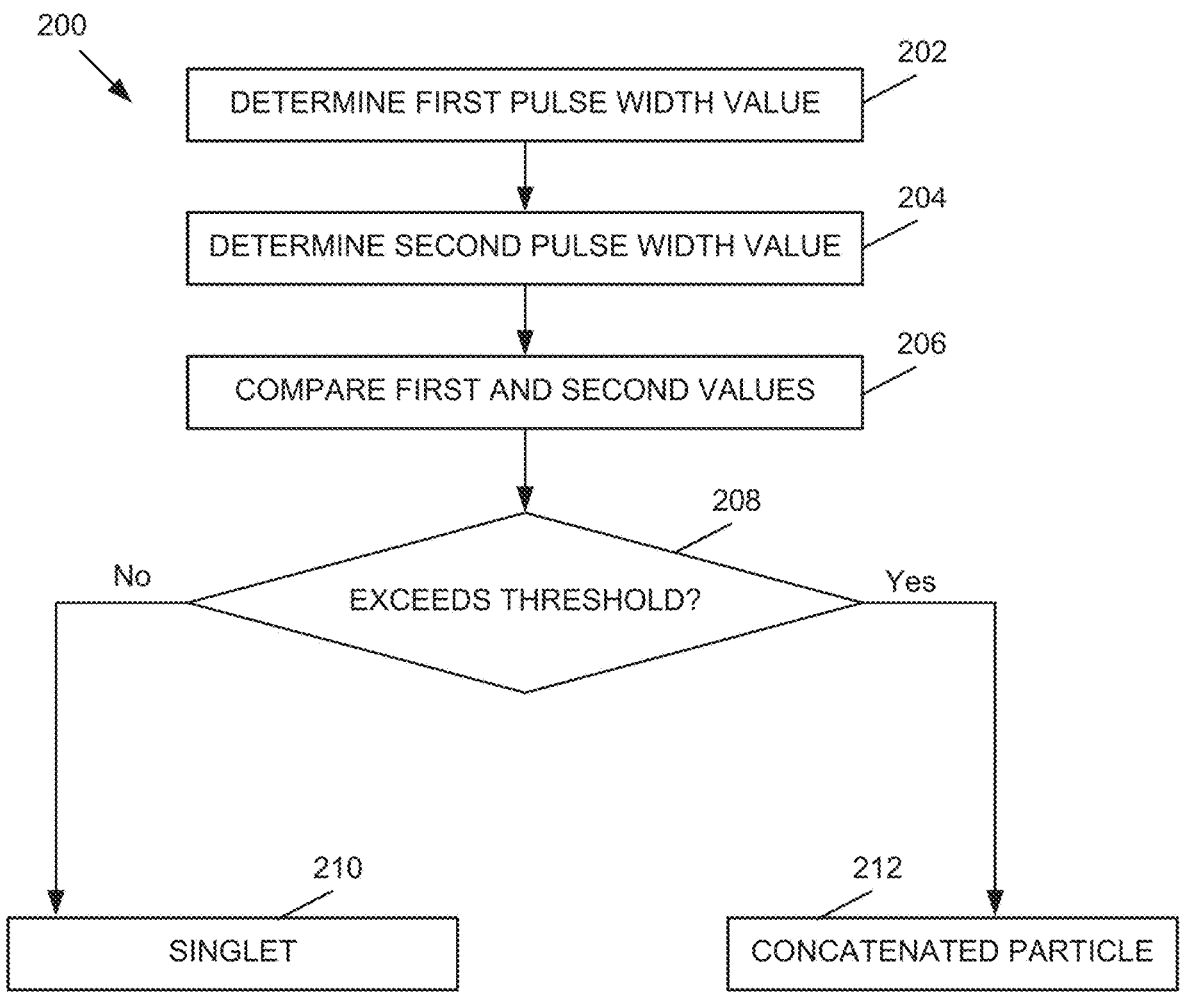
FIG. 2 schematically illustrates an example of a method of characterizing particles that can be performed by the flow cytometer system of FIG. 1.

FIG. 2 schematically illustrates an example of a method 200 of characterizing particles that can be performed by the flow cytometer system 100. In some examples, the method 200 is performed by the waveform analysis device 150.

The method 200 includes an operation 202 of determining a first pulse width value of a particle using a first technique. In some examples, the first technique includes directly measuring a pulse width of the particle. An example of the first technique is described by the method 300 shown in FIG. 3, which will be described in more detail below.

Figure 9:
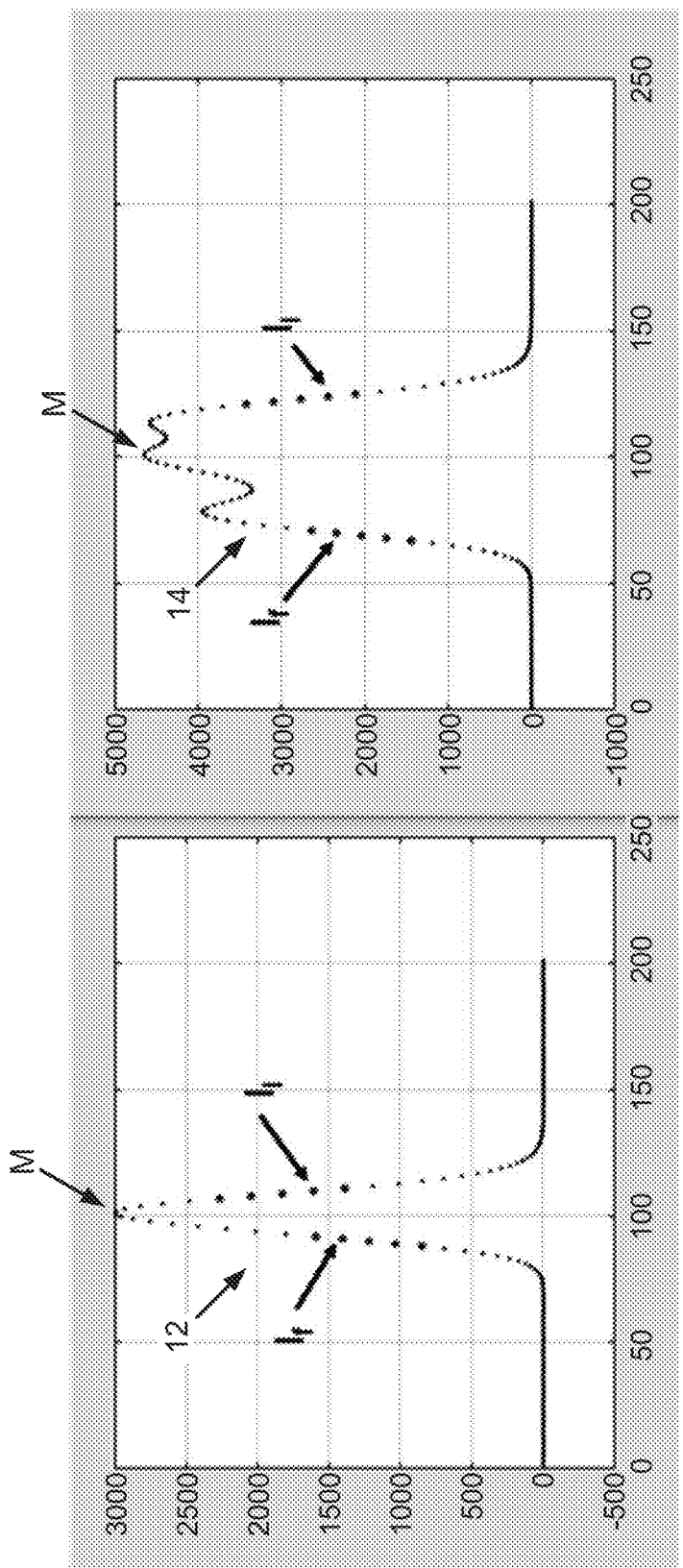
FIG. 9 graphically illustrates examples of the first and second waveforms after completion of a step in the operation of FIG. 8.

The method 200 includes an operation 204 of determining a second pulse width value of the particle using a second technique. In some examples, the second technique includes indirectly measuring the pulse width. An example of the second technique is shown in FIG. 9, which will be described in more detail below.

The method 200 includes an operation 206 of comparing the first and second pulse width values. In some examples, operation 206 includes determining a difference between the first and second pulse width values. In some examples, the difference between the first and second pulse width values is determined by Equation 1, $$\text{Difference} = C \left| \frac{W1 - W2}{W1 + W2} \right| \quad (1)$$

where W1 is the first pulse width value, and W2 is the second pulse width value. In view of Equation 1, the difference between the first and second pulse width values is determined by subtracting the second pulse width value from the first pulse width value, dividing by a sum of the first and second pulse width values, obtaining absolute value of result, and multiplying by a coefficient C. In some examples, the coefficient C is 2. The coefficient C may vary depending on the hardware of the flow cytometer system 100. As described above, the first pulse width value W1 can include directly measuring the pulse width of the particle such as by performing the method 300 illustrated in FIG. 3, and the second pulse width value W2 can include indirectly measuring the pulse width of the particle.

The method 200 further includes an operation 208 of determining whether the difference between the first and second pulse width values exceeds a threshold. When the difference is equal to or less than the threshold (i.e., "No" in operation 208), the method 200 proceeds to an operation 210 of characterizing the particle as a singlet particle. Otherwise, when the difference exceeds the threshold (i.e., "Yes" in operation 208), the method 200 proceeds to an operation 212 of characterizing the particle as a concatenated particle. As used herein, a concatenated particle includes two or more particles that pass through the interrogation zone 116 at substantially the same time such as a doublet, triplet, quadruplet, and so on.

In some further examples, the method 200 can include characterizing pulse measurements of any shape including those distorted by saturation, noise, incorrect baseline correction, and the like from pulse measurements of a gaussian shape that are typical of single, isolated particles passing through the interrogation zone 116 (i.e., "singlets"). In some examples, the method 200 can further include sorting the particle into one or more groups based on the difference between the first and second pulse width values. In such examples, the flow cytometer system 100 is a sorting flow cytometer that extracts particles out of the sample stream based on the difference between the first and second pulse width values calculated for the particles.

Figure 3:
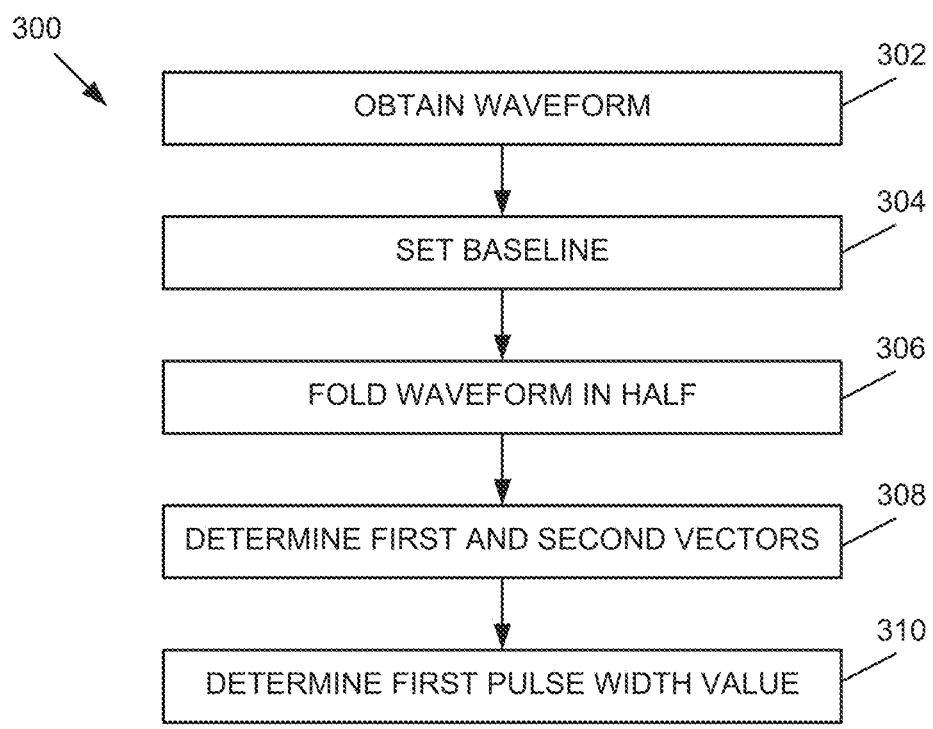
FIG. 3 schematically illustrates an example of a method of measuring a first pulse width value of a particle that can be performed by the flow cytometer system of FIG. 1.

FIG. 3 schematically illustrates an example of a method 300 of determining a direct pulse width value of a particle. In some examples, the method 300 is performed as operation 202 of the method 200. The method 300 can be performed by the flow cytometer system 100. In some examples, the method is performed by the waveform analysis device 150.

The method 300 includes an operation 302 of obtaining a waveform of a particle. For example, operation 302 can include the waveform analysis device 150 obtaining the waveform from the waveform acquisition device 140 after analog waveform data 126 received from the detectors 124 has been digitized by the ADC 142 of the waveform acquisition device 140.

Figure 4:
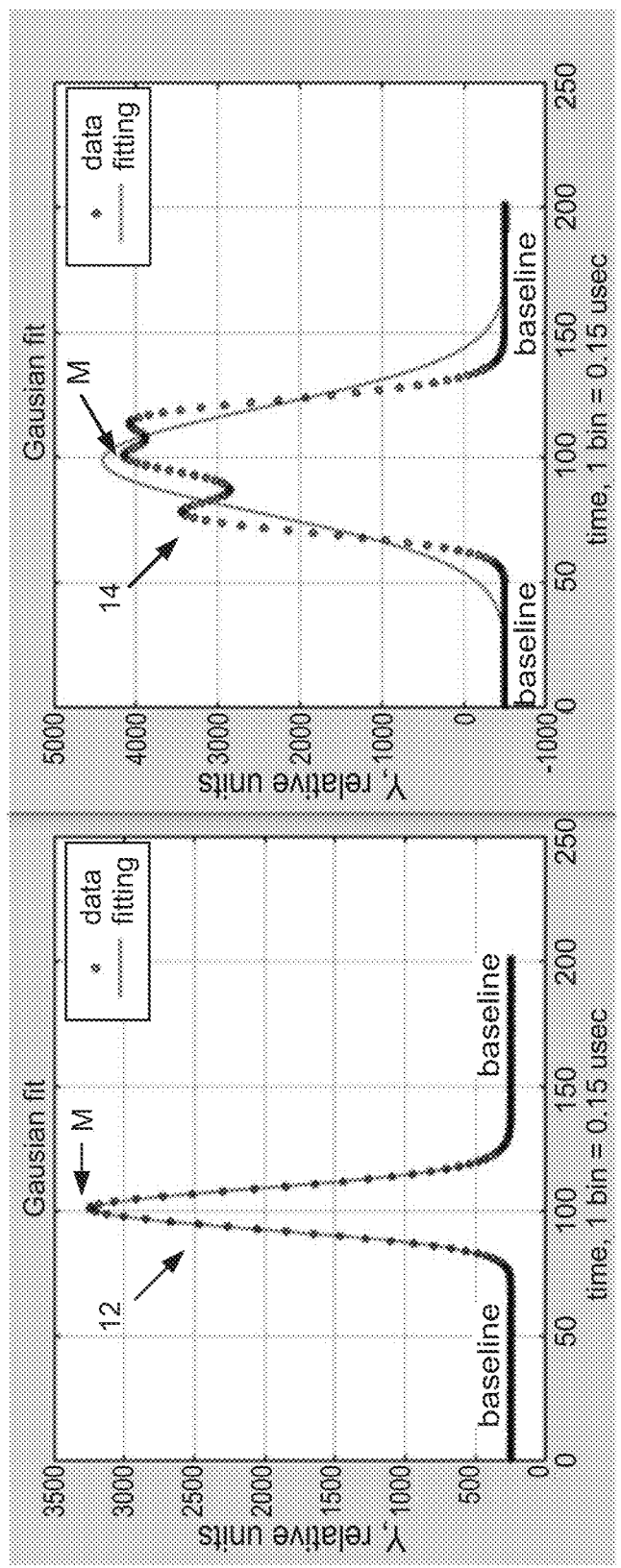
FIG. 4 graphically illustrates examples of first and second waveforms obtained in an operation of the method of FIG. 3.

FIG. 4 graphically illustrates examples of first and second waveforms 12, 14 obtained in operation 302 of the method 300. In this example, the first and second waveforms 12, 14 are from HEK293 cells analyzed by the flow cytometer system 100. As described above, particles are constrained to pass in a single file line through the interrogation zone 116 where the particles intersect with the one or more light excitation beams from the light emitting unit 102. This causes the particles to emit and/or scatter light, which is collected by the detectors 124 and converted into waveforms such as the first and second waveforms 12, 14 shown in FIG. 4. In this example, the first and second waveforms 12, 14 are shown as each having experimental data points, and a solid line that is a gaussian fitting to the experimental data points.

In the example of FIG. 4, the first waveform 12 has a gaussian shape having a single peak, which is representative of a single, isolated particle passing through the interrogation zone 116 (i.e., a "singlet"). The second waveform 14 has a non-gaussian shape having two peaks, which is representative of simultaneous illumination of two particles passing through the interrogation zone 116 (i.e., a "doublet"). Higher particle concentrations and/or increasing the cross-sectional dimension of the fluid stream 114 increases the probability of simultaneously illuminating two or more particles passing through the interrogation zone 116. While the following disclosure refers to doublets, the techniques described herein can be similarly applied to detect other types of n-concatenated cells including triplets, quadruplets, and the like.

Referring back to FIG. 3, the method 300 includes an operation 304 of setting a baseline to zero for the waveform obtained in operation 302. Operation 304 can include determining a mean value for the baseline on both sides of the waveform of the particle, and subtracting the mean value from data points of the waveform to set the baseline to zero.

As shown in the example of FIG. 4, the first waveform 12 has a baseline having a mean value of about 250 units, and operation 304 includes subtracting the mean value of about 250 units from all of the data points of the first waveform 12. As a further example, the second waveform 14 has a baseline having a mean value of about −500 units, and operation 304 includes subtracting this mean value from all of the data points of the second waveform 14. As used herein, the units represent voltage values from the detectors 124 that are digitized by the ADC 142 of the waveform acquisition device 140 using predefined sample rate and bit resolution.

Figure 5:
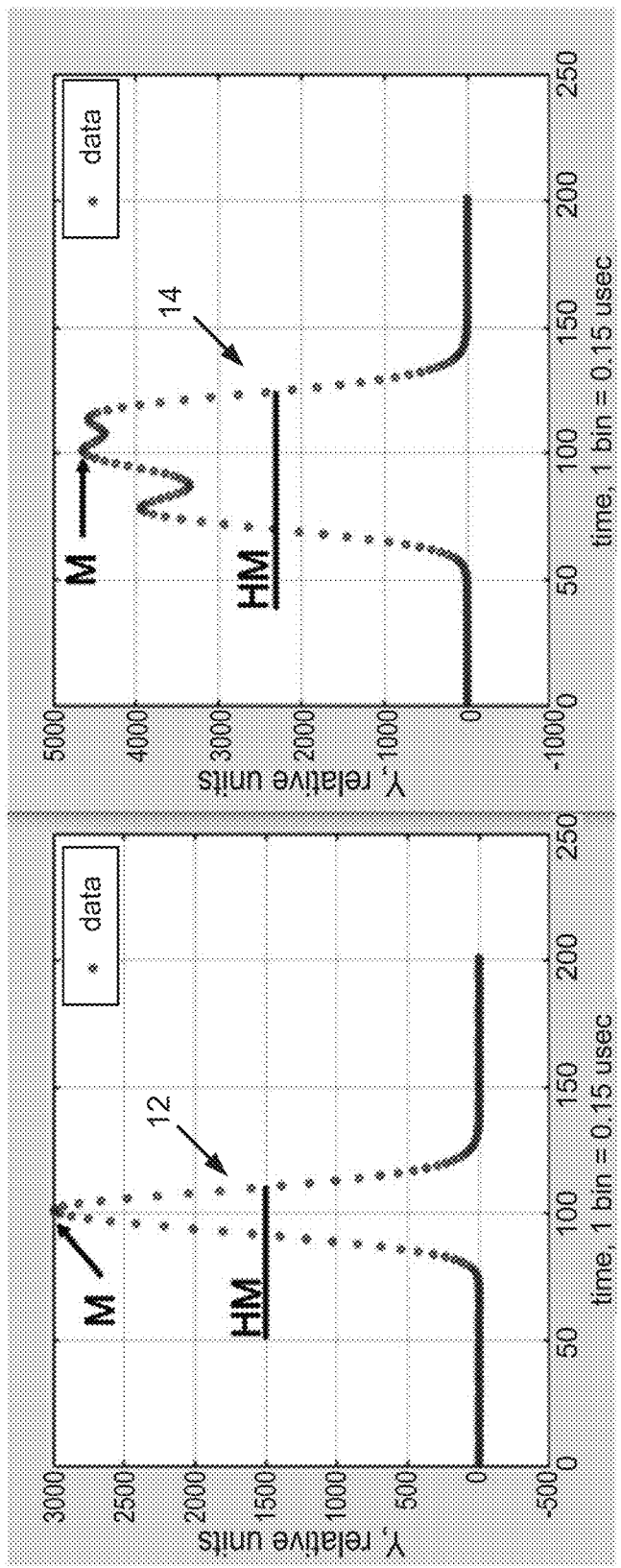
FIG. 5 graphically illustrates examples of the first and second waveforms after completion of an operation in the method of FIG. 3.

FIG. 5 graphically illustrates examples of the first and second waveforms 12, 14 after completion of the operation 304 in the method 300. As shown in FIG. 5, the first and second waveforms 12, 14 each have their baseline set to zero. Also, as shown in FIGS. 4 and 5, the maximum (M) value of the first waveform 12 decreased by about 250 units from about 3250 units in FIG. 4 to about 3000 units in FIG. 5, the maximum (M) value of the second waveform 14 increased by about 500 units from about 4100 units in FIG. 4 to about 4600 units in FIG. 5.

Figure 6:
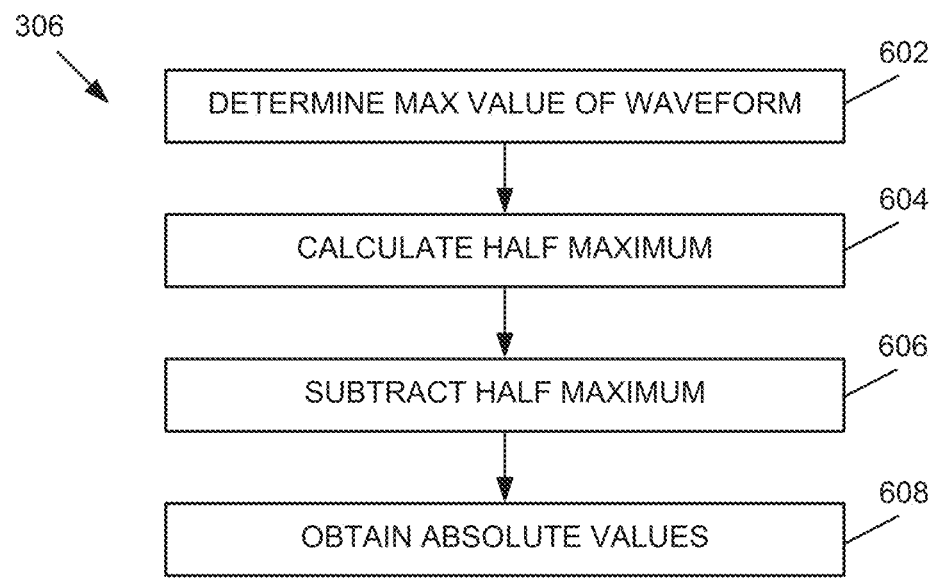
FIG. 6 illustrates in more detail an example of an operation in the method of FIG. 3.

Referring back to FIG. 3, the method 300 includes an operation 306 of folding the waveform in half FIG. 6 schematically illustrates an example of operation 306 in more detail. Operation 306 can include a step 602 of determining the maximum (M) value of the waveform. In the example of FIG. 5, the maximum (M) value of the first waveform 12 is about 3000 units, and the maximum (M) value of the second waveform 14 is about 4600 units.

Operation 306 can further include a step 604 of calculating a half maximum (HM) value by dividing the maximum (M) value in two. In the illustrative example shown in FIG. 5, the half maximum (HM) value of the first waveform 12 is about 1500 units. As further shown in FIG. 5, and the half maximum (HM) value of the second waveform 14 is about 2300 units.

Figure 7:
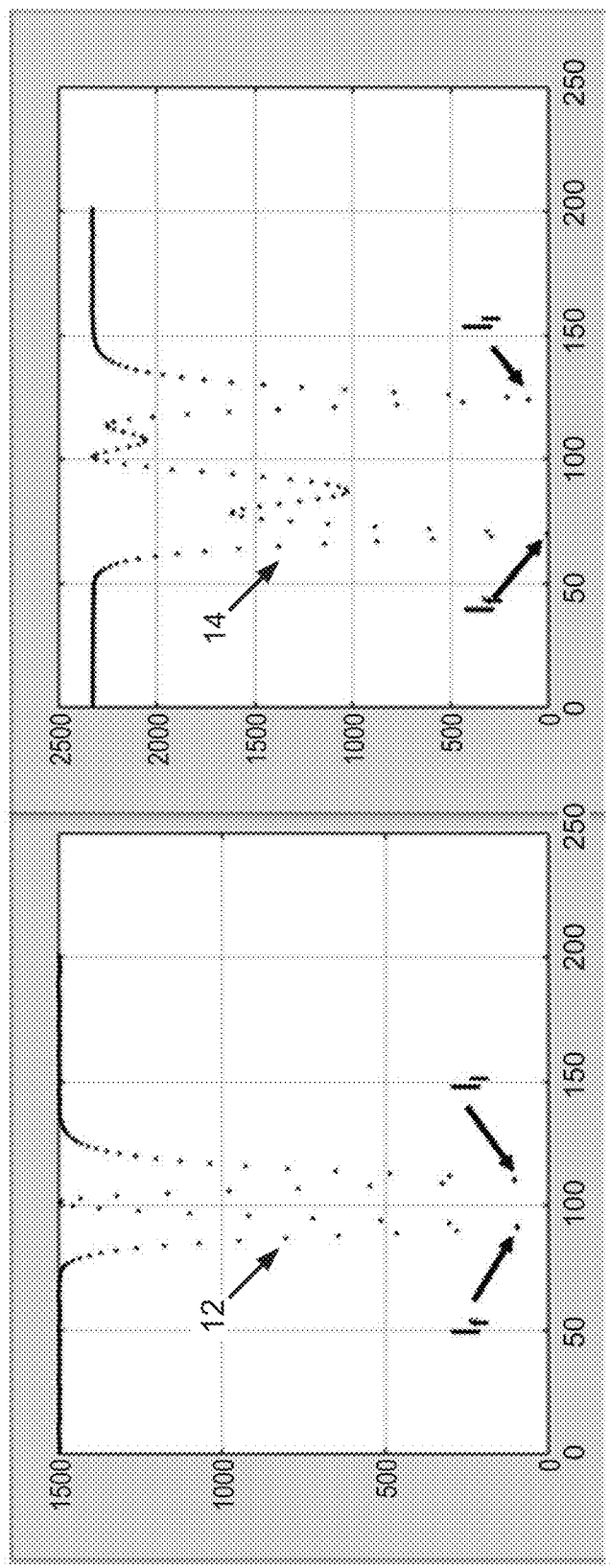
FIG. 7 graphically illustrates examples of the first and second waveforms after completion of the operation in FIG. 6.

Operation 306 can further include a step 606 of subtracting the half maximum (HM) value from the data points of the waveform, and a step 608 of obtaining absolute values for the data points to generate a folded waveform. FIG. 7 graphically illustrates examples of the first and second waveforms 12, 14 after completion of the operation 306 in the method 300.

Figure 8:
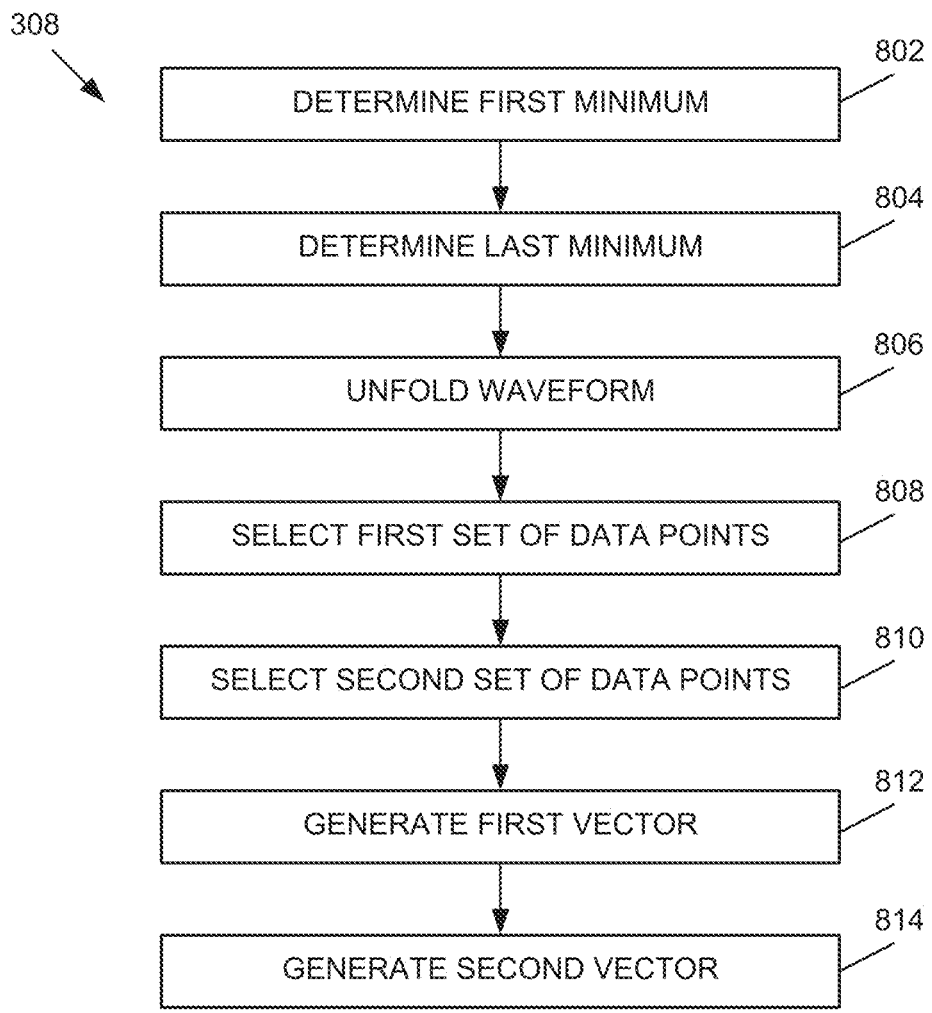
FIG. 8 illustrates an example of another operation in the method of FIG. 3.

Referring back to FIG. 3, the method 300 includes an operation 308 of determining first and second vectors. FIG. 8 schematically illustrates an example of operation 308 in more detail. Operation 308 can include a step 802 of determining a first minimum ($l_f$) data point in the folded waveform, and a step 804 of determining a last minimum ($l_l$) in the folded waveform.

In the example shown in FIG. 7, the first minimum ($l_f$) data point of the first waveform 12 occurs at about 91 bin units, and the last minimum ($l_l$) data point of the first waveform 12 occurs at about 110 bin units. The first minimum ($l_f$) data point of the second waveform 14 occurs at about 70 bin units, and the last minimum ($l_l$) data point of the second waveform 14 occurs at about 124 bin units. As used herein, 1 bin unit equals 0.15 (μs).

Operation 308 can further include a step 806 of unfolding the waveform, a step 808 of selecting a first set of data points around the first minimum ($l_f$) data point, and a step 810 of selecting a second set of data points around the last minimum ($l_l$) data point. As an example, step 808 can include selecting about 5 data points around the first minimum ($l_f$) data point, and step 810 can include selecting about 5 data points around the last minimum ($l_l$) data point.

FIG. 9 graphically illustrates examples of the first and second waveforms 12, 14 after completion of step 810 in operation 308. As shown in FIG. 9, the first waveform 12 includes a first set of data points around the first minimum ($l_f$) data point on a first side of the maximum (M) value of the first waveform 12, and a second set of data points around the last minimum ($l_l$) data point on a second side of the maximum (M) value of the first waveform 12.

Similarly, as further shown in the example of FIG. 9, the second waveform 14 includes a first set of data points around the first minimum ($l_f$) data point on a first side of the maximum (M) value of the second waveform 14, and a second set of data points around the last minimum (11) data point on a second side of the maximum (M) value of the second waveform 14.

Figure 10:
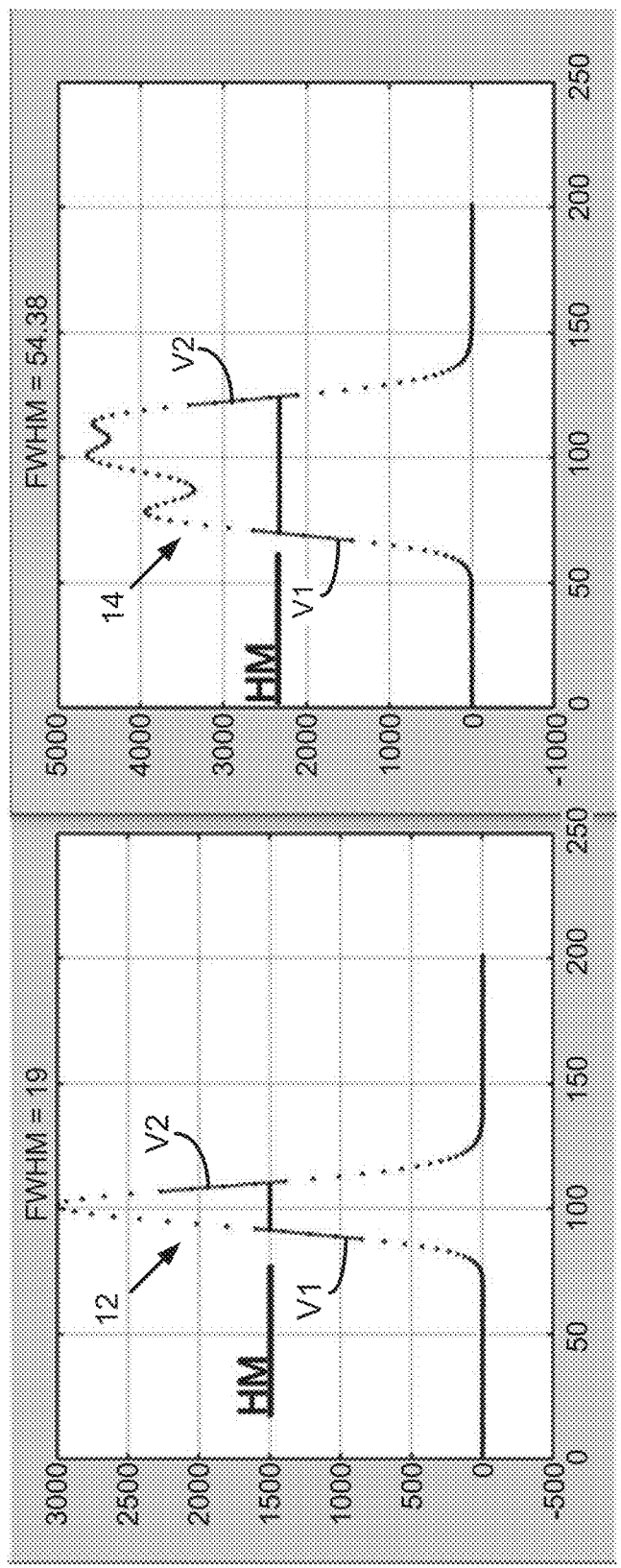
FIG. 10 graphically illustrates examples of first and second vectors generated for the first and second waveforms after completion of the operation of FIG. 8.

Operation 308 can further include a step 812 of generating the first vector by performing linear regression on the first set of data points, and a step 814 of generating the second vector by performing linear regression on the second set of data points. FIG. 10 graphically illustrates examples of the first and second vectors V1, V2 generated for the first and second waveforms 12, 14 after completion of the operation 308 in the method 300.

Referring back to FIG. 3, the method 300 includes an operation 310 of determining the first pulse width value as a distance between the first and second vectors V1, V2 at the half maximum value. In some instances, the first pulse width value is a full width at half maximum (FWHM). In this illustrative example, the first pulse width value of the first waveform 12 calculated in accordance with the method 300 is 19.00, and the first pulse width value calculated in accordance with the operations of the method 300 of the second waveform 14 is 54.38.

Figure 11:
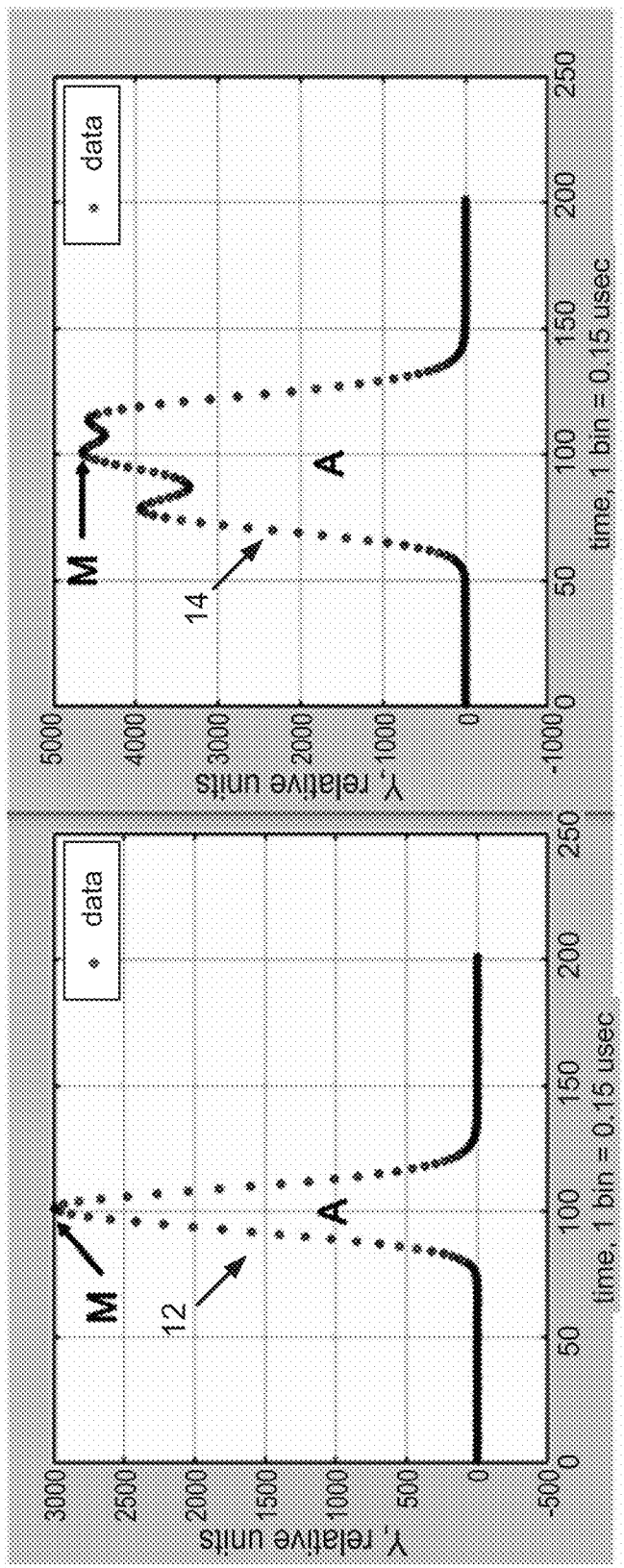
FIG. 11 graphically illustrates examples of measuring a second pulse width value of the first and second waveforms of FIG. 4.

FIG. 11 graphically illustrates examples of measuring the second pulse width value of the first and second waveforms 12, 14. As shown in FIG. 11, measuring the second pulse width value can also include setting the baseline to zero (i.e., operation 304 of the method 300) by determining a mean value for a baseline on both sides of a waveform of a particle, and subtracting the mean value from data points of the waveform.

The second pulse width value is an indirect measurement of the pulse width of the first and second waveforms 12, 14 derived from the maximum (M) value and the pulse area (A). The second pulse width value is calculated in accordance with Equation 2.

$$\text{Pulse Width} = 1.6651 \times \sigma \quad (2)$$

$$\sigma = 0.5642 \times \frac{A}{M}$$

$$A = \text{sum}(Y)$$

In this illustrative example, the second pulse width value of the first waveform 12 is 19.14 bin units, and the second pulse width value of the second waveform 14 is 47.70 bin units. Table 1, as provided below, summarizes the first and second pulse width values of the first and second waveforms 12, 14, and the difference between these values calculated by Equation 1.

TABLE 1

|  | First Pulse Width Value | Second Pulse Width Value | Difference |
|---|---|---|---|
| First Waveform | 19.00 | 19.14 | 0.0073 |
| Second Waveform | 54.38 | 47.70 | 0.1309 |

In view of the foregoing, the difference (0.0073) between the first and second pulse width values of the first waveform 12 is small, which is expected since the first waveform 12 has a gaussian shape that is typical of a single, isolated particle passing through the interrogation zone 116 (i.e., a "singlet"). In contrast, the difference (0.1309) between the first and second pulse width values of the second waveform 14 is large, which is expected since the second waveform 14 has a non-gaussian shape with two peaks, which is typical of simultaneous illumination of two particles passing through the interrogation zone 116 (i.e., a "doublet"). The calculated difference between the first and second pulse width values for a given waveform can be compared to a threshold for characterizing the waveform as a singlet or other type of particle.

Figure 12:
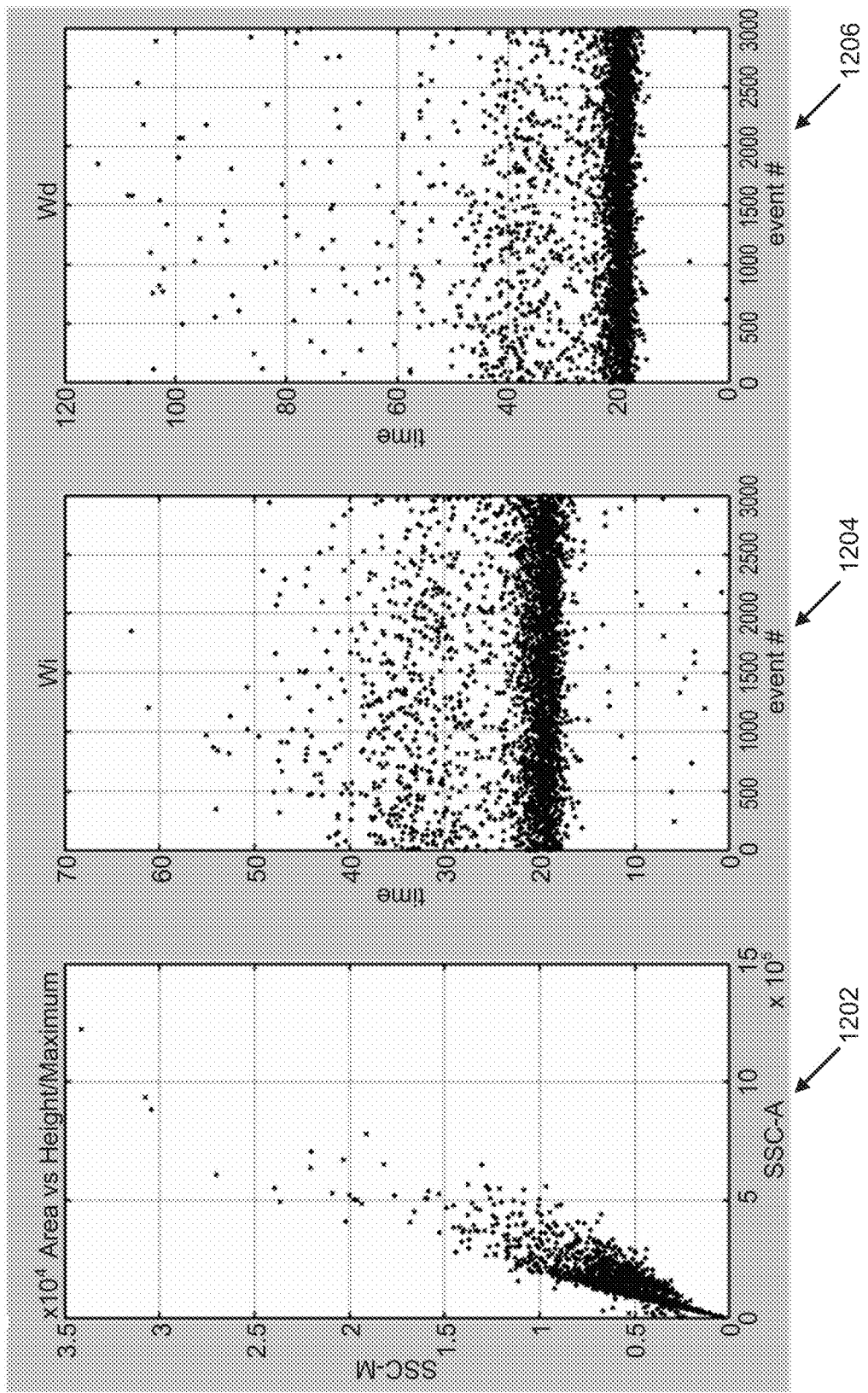
FIG. 12 graphically illustrates data acquired from the flow cytometer system of FIG. 1 prior to characterizing the particles in accordance with the method of FIG. 2.

FIG. 12 graphically illustrates data acquired from the flow cytometer system 100 prior to characterizing the particles in accordance with the method 200. In the illustrative example of FIG. 12, 3000 pulse measurements from a sample of HEK293 cells are obtained. A first plot 1202 includes pulse area (A) versus maximum (M) value. A second plot 1204 includes the second pulse width values determined in accordance with Equation 2. A third plot 1206 includes the first pulse width values determined in accordance with the method 300.

Figure 13:
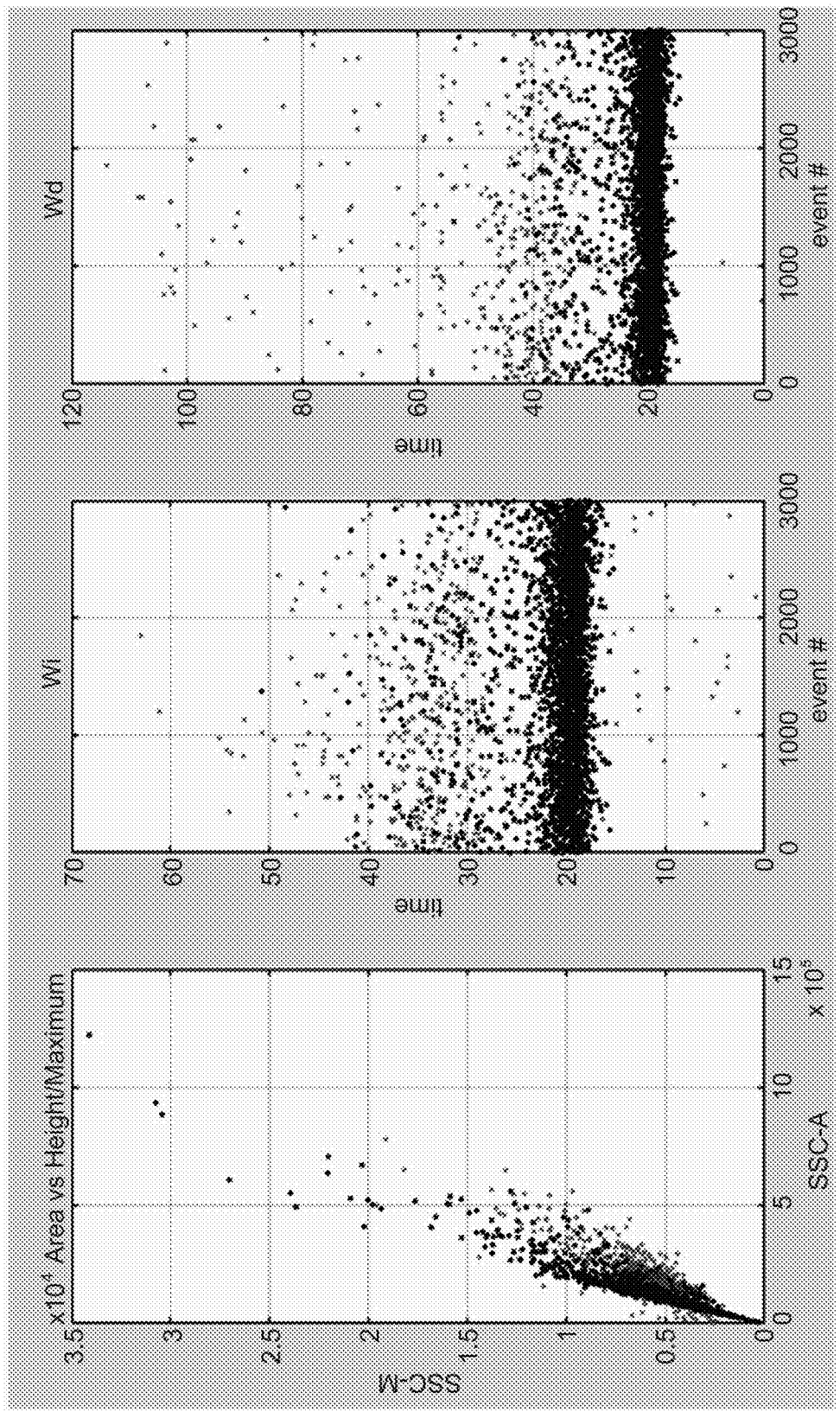
FIG. 13 graphically illustrates data acquired from the flow cytometer system of FIG. 1 after characterizing the particles in accordance with the method of FIG. 2, the particles being characterized using a first threshold.

FIG. 13 graphically illustrates data acquired from the flow cytometer system 100 after characterizing the particles in accordance with the method 200. FIG. 13 includes first, second, and third plots 1302, 1304, 1306 of the same data shown in FIG. 12 of the 3000 pulse measurements from the sample of HEK293 cells. In FIG. 13, the particles are characterized by using a first threshold of 0.1 such that the cells are characterized as concatenated cells (i.e., doublets, triplets, and the like) when the difference between the first and second pulse width values exceeds the first threshold. In this illustrative example, the first waveform 12 would be characterized as a singlet because the difference between the first and second pulse width values of the first waveform 12 is less than 0.1 (0.0073<0.1), and the second waveform 14 would be characterized as a doublet (or other concatenated particle) because the difference between the first and second pulse width values of the second waveform 14 is greater than 0.1 (0.1309>0.1).

Figure 14:
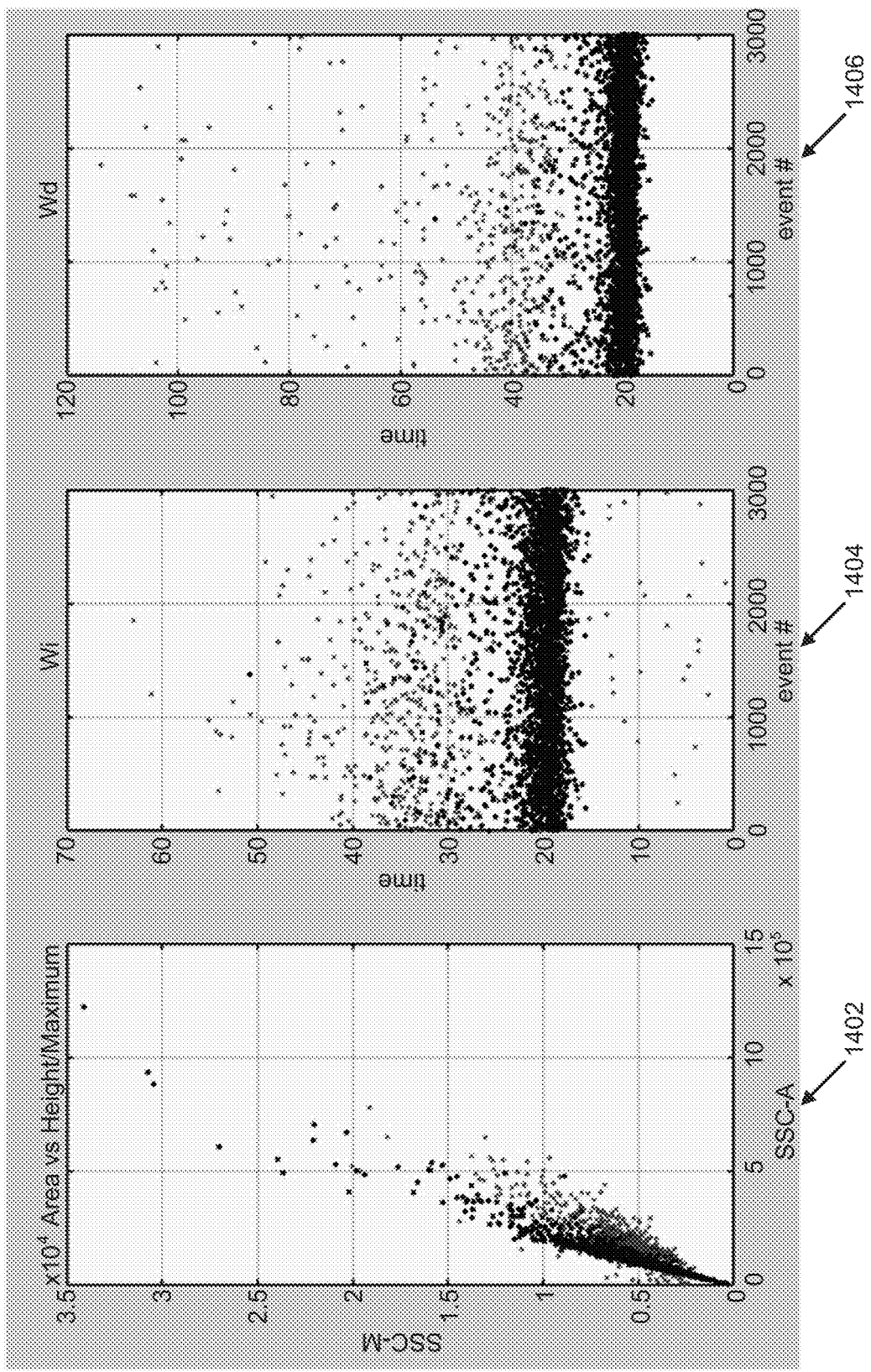
FIG. 14 graphically illustrates data acquired from the flow cytometer system of FIG. 1 after characterizing the particles in accordance with the method of FIG. 2, the particles being characterized using a second threshold.

FIG. 14 graphically illustrates data acquired from the flow cytometer system 100 after characterizing the particles in accordance with the method 200. FIG. 14 includes first, second, and third plots 1402, 1404, 1406 of the same data shown in FIG. 12 of the 3000 pulse measurements from the sample of HEK293 cells. In FIG. 14, the particles are characterized by using a second threshold of 0.07 such that the cells are characterized as concatenated cells (i.e., doublets, triplets, and the like) when the difference between the first and second pulse width values exceeds the second threshold. In this example, the first waveform 12 would be characterized as a singlet because the difference between the first and second pulse width values of the first waveform 12 is less than 0.07 (0.0073<0.07). The second waveform 14 would be characterized as a doublet (or other type of particle) because the difference between the first and second pulse width values of the second waveform 14 is greater than 0.07 (0.1309>0.07).

Figure 15:
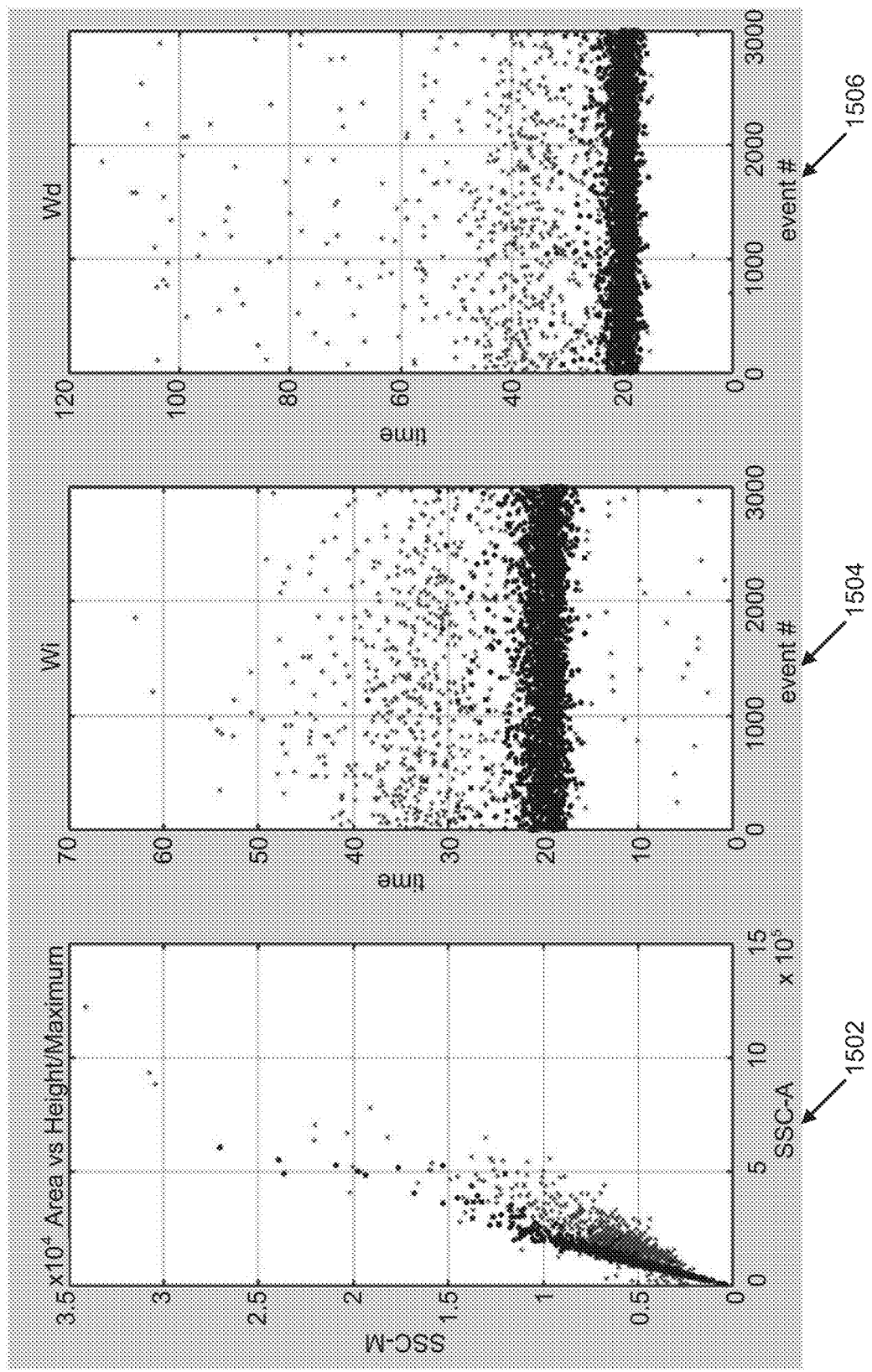
FIG. 15 graphically illustrates data acquired from the flow cytometer system of FIG. 1 after characterizing the particles in accordance with the method of FIG. 2, the particles being characterized using a third threshold.

FIG. 15 graphically illustrates data acquired from the flow cytometer system 100 after characterizing the particles in accordance with the method 200. FIG. 15 includes first, second, and third plots 1502, 1504, 1506 of the same data shown in FIG. 12 of the 3000 pulse measurements from the sample of HEK293 cells. In FIG. 15, the particles are characterized by using a third threshold of 0.03 such that the cells are characterized as concatenated cells (i.e., doublets, triplets, and the like) when the difference between the first and second pulse width values exceeds the third threshold. In this example, the first waveform 12 would be characterized as a singlet because the difference between the first and second pulse width values of the first waveform 12 is less than 0.03 (0.0073<0.03). The second waveform 14 would be characterized as a doublet (or other type of particle) because the difference between the first and second pulse width values of the second waveform 14 is greater than 0.03 (0.1309>0.03).

Given the foregoing, the method 200 is an objective approach to distinguishing single, isolated particles passing through the interrogation zone 116 from other types of particles such as concatenated particles (e.g., doublets, triplets, and the like), also from pulse measurements distorted by saturation, noise, wrong baseline correction, and the like. Furthermore, the threshold value (e.g., first threshold of 0.1, second threshold of 0.07, and third threshold of 0.03) can be adjusted as desired to achieve different level(s) of pulse shape discrimination. Also, the pulse shape discrimination by the method 200 is automatic such that it does not require prior populations to set gates for further discrimination, and can instead be performed on the fly. This can result in higher yields. Also, the pulse shape discrimination by the method 200 can be performed on a field-programmable gate array (FPGA) that is an integrated circuit designed to be configured by a customer or a designer after manufacturing.

Figure 16:
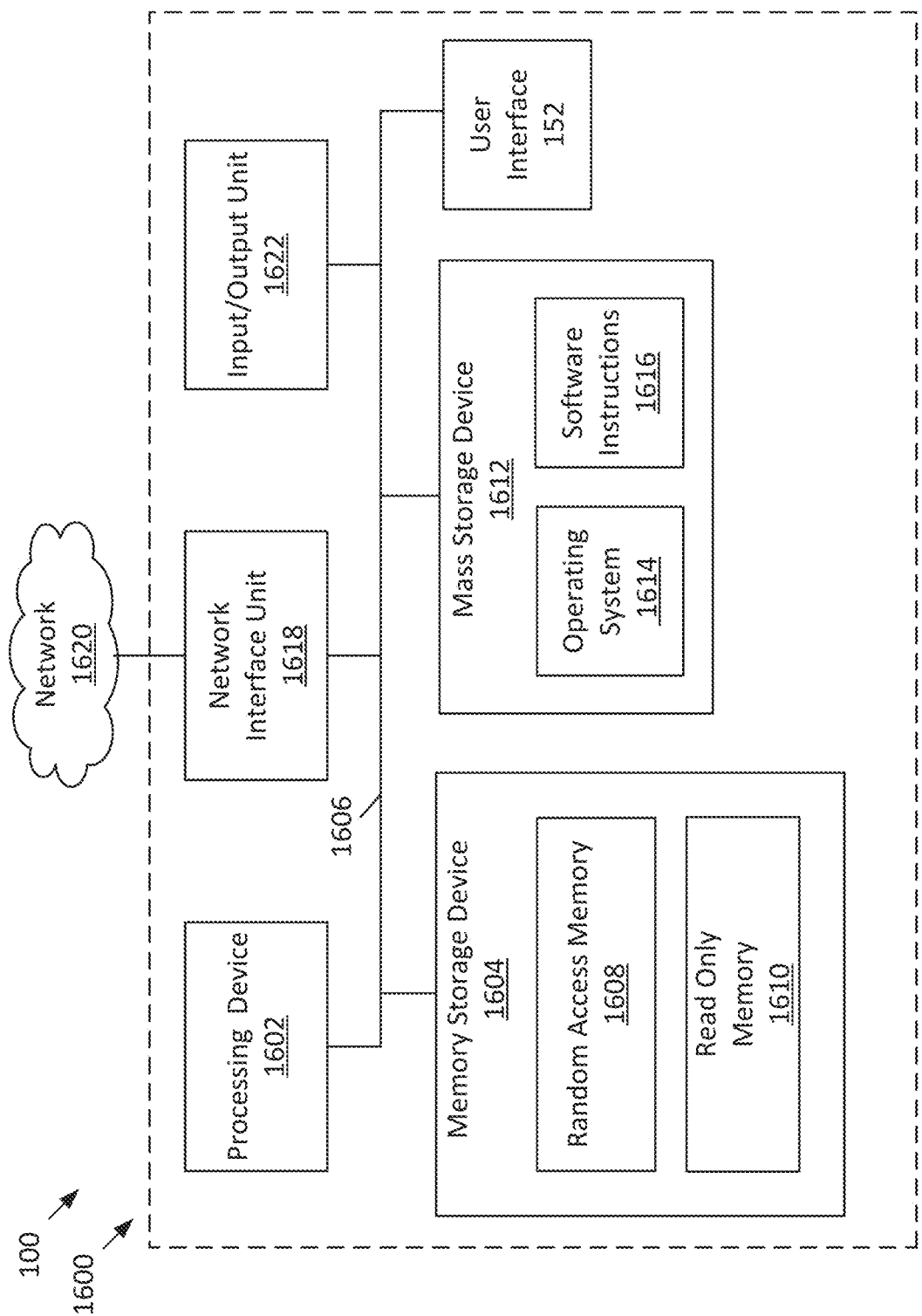
FIG. 16 illustrates an exemplary architecture of a computing system that can be used to implement aspects of the flow cytometer system of FIG. 1.

FIG. 16 schematically illustrates an exemplary architecture of a computing device 1600 for implementing aspects of the flow cytometer system 100 including aspects performed by the waveform analysis device 150. The computing device 1600 includes one or more processing devices 1602, a memory storage device 1604, and a system bus 1606 coupling the memory storage device 1604 to the one or more processing devices 1602.

The one or more processing devices 1602 can include a processor such as a central processing unit (CPU). The one or more processing devices 1602 can include a microcontroller having one or more digital signal processors, field-programmable gate arrays (FPGA), and/or other types of electronic circuits. In some further examples, the one or more processing devices 1602 are part of a processing circuitry having non-transitory computer readable storage media storing instructions which, when executed by the processing circuitry, cause the processing circuitry to perform the aspects and functionalities described herein.

The memory storage device 1604 can include a random-access memory ("RAM") 1608 and a read-only memory ("ROM") 1610. Basic input and output logic having basic routines transferring information between elements in the flow cytometer system 100 can be stored in the ROM 1610. The flow cytometer system 100 can additionally include a mass storage device 1612 that can store an operating system 1614 and software instructions 1616. The mass storage device 1612 is connected to the one or more processing devices 1602 through the system bus 1606. The mass storage device 1612 and computer-readable data storage media provide non-volatile, non-transitory computer memory storage.

Although the description of computer-readable data storage media contained herein refers to the mass storage device 1612, it should be appreciated by those skilled in the art that computer-readable data storage media can be any available non-transitory, physical device or article of manufacture from which the flow cytometer system 100 can read data and/or instructions. The computer-readable storage media can be comprised of entirely non-transitory media. The mass storage device 1612 is an example of a computer-readable storage device.

Computer-readable data storage media include volatile and non-volatile, removable, and non-removable, media implemented in any method or technology for storage of information such as computer-readable software instructions, data structures, program modules or other data. Example types of computer-readable data storage media include, but are not limited to, RAM, ROM, EPROM, EEPROM, flash memory or other solid-state memory technology, or any other medium which can be used to store information, and which can be accessed by the device.

The flow cytometer system 100 can operate in a networked environment using logical connections to the other devices through a communications network 1620. For example, the computing device 1600 connects to the communications network 1620 through a network interface unit 1618 connected to the system bus 1606. The network interface unit 1618 can connect to other types of communications networks and devices, including through Bluetooth, Wi-Fi, Ethernet, and cellular telecommunications networks. The network interface unit 1618 can connect the computing device 1600 to additional networks, systems, and devices. The computing device 1600 also includes an input/output unit 1622 for receiving and processing inputs and outputs from one or more peripheral devices, and the user interface 152.

The mass storage device 1612 and the RAM 1608 store software instructions and data. The software instructions can include an operating system 1614 suitable for controlling the operation of the computing device 1600. The mass storage device 1612 and/or the RAM 1608 can also store the software instructions 1616, which when executed by the one or more processing devices 1602, provide the functionalities and aspects described herein.

The various embodiments described above are provided by way of illustration only and should not be construed to be limiting in any way. Various modifications can be made to the embodiments described above without departing from the true spirit and scope of the disclosure.

Embodiments of the disclosure can be described with reference to the following numbered clauses, with preferred features laid out in the dependent clauses:

1. A method of characterizing particles in flow cytometry, the method comprising:
   determining a first pulse width value of a particle using a first technique;
   determining a second pulse width value of the particle using a second technique;
   comparing the first and second pulse width values; and
   characterizing the particle as a concatenated particle when a difference between the first and second pulse width values exceeds a threshold.
2. The method of clause 1, wherein the first technique includes directly measuring a pulse width of the particle, and the second technique includes indirectly measuring the pulse width.
3. The method of clause 2, wherein the first and second techniques each include:
   determining a mean value for a baseline on both sides of a waveform of the particle; and
   subtracting the mean value from data points of the waveform to set the baseline to zero.
4. The method of clause 3, wherein the first technique further includes:
   determining a maximum value of the waveform;
   calculating a half maximum value by dividing the maximum value by two;
   subtracting the half maximum value from the data points of the waveform; and
   obtaining absolute values for the data points to generate a folded waveform.
5. The method of clause 4, wherein the first technique further includes:
   determining a first minimum and a last minimum in the folded waveform;
   selecting a first set of data points around the first minimum; and
   selecting a second set of data points around the last minimum.
6. The method of clause 5, wherein the first technique further includes:
   generating a first vector by performing linear regression on the first set of data points;
   generating a second vector by performing linear regression on the second set of data points; and
   determining the first pulse width value as a distance between the first and second vectors at the half maximum value.
7. The method as in any one of the preceding clauses, wherein the second technique further includes:
   measuring the second pulse width value as a function of the maximum value of the waveform and an area of the waveform.
8. The method as in any one of the preceding clauses, wherein the difference between the first and second pulse width values is calculated by:
   subtracting the second pulse width value from the first pulse width value;
   dividing by a sum of the first and second pulse width values;
   obtaining an absolute value; and
   multiplying the absolute value by a coefficient.
9. The method as in any one of the preceding clauses, wherein the threshold is 0.1.
10. The method as in any one of the preceding clauses, wherein the threshold is 0.07.
11. The method as in any one of the preceding clauses, wherein the threshold is 0.03.
12. The method as in any one of the preceding clauses, further comprising:
    characterizing the particle as a singlet particle when the difference between the first and second pulse width values is equal to or less than the threshold.
13. The method as in any one of the preceding clauses, further comprising:
    characterizing the particle as having a gaussian shape when the difference between the first and second pulse width values is equal to or less than the threshold.
14. The method as in any one of the preceding clauses, further comprising:
    characterizing the particle as having a non-gaussian shape when the difference between the first and second pulse width values exceeds the threshold.
15. The method as in any one of the preceding clauses, further comprising:
    sorting the particle into one or more groups based on the difference between the first and second pulse width values.
16. A system for characterizing particles, the system comprising:
    a light emitting unit generating one or more excitation light beams;
    a fluidic system streaming the particles through the one or more excitation light beams at an interrogation zone;
    optical elements directing scattered light from the interrogation zone;
    one or more detectors measuring characteristics of the scattered light; and
    a processing circuitry having non-transitory computer readable storage media storing instructions which, when executed by the processing circuitry, cause the processing circuitry to:
       determine first pulse width values of the particles using a first technique;
       determine second pulse width values of the particles using a second technique;
       compare the first and second pulse width values; and
       characterize the particles as concatenated particles when a difference between the first and second pulse width values exceeds a threshold.
17. The system of clause 16, wherein the first technique includes directly measuring a pulse width of the particles, and the second technique includes indirectly measuring the pulse width.

18. The system of clause 17, wherein the first and second techniques each include:
   determine a mean value for a baseline on both sides of a waveform of a particle; and
   subtract the mean value from data points of the waveform to set the baseline to zero.
19. The system of clause 18, wherein the first technique further includes:
   determine a maximum value of the waveform;
   calculate a half maximum value by dividing the maximum value by two;
   subtract the half maximum value from the data points of the waveform; and
   obtain absolute values for the data points to generate a folded waveform.
20. The system of clause 19, wherein the first technique further includes:
   determine a first minimum and a last minimum in the folded waveform;
   select a first set of data points around the first minimum; and
   select a second set of data points around the last minimum.
21. The system of clause 20, wherein the first technique further includes:
   generate a first vector by performing linear regression on the first set of data points;
   generate a second vector by performing linear regression on the second set of data points; and
   measure the first pulse width value as a distance between the first and second vectors at the half maximum value.
22. The system as in any of clauses 16-21, wherein the second technique further includes:
   measure the second pulse width value as a function of the maximum value of the waveform and an area of the waveform.
23. The system as in any of clauses 16-22, wherein the difference between the first and second pulse width values is calculated by:
   subtracting the second pulse width value from the first pulse width value;
   dividing by a sum of the first and second pulse width values;
   obtaining an absolute value; and
   multiplying the absolute value by a coefficient.
24. The system as in any of clauses 16-23, wherein the threshold is 0.1.
25. The system as in any of clauses 16-23, wherein the threshold is 0.07.
26. The system as in any of clauses 16-23, wherein the threshold is 0.03.
27. A method of characterizing a particle in flow cytometry, the method comprising:
   obtaining a waveform of the particle;
   determining a mean value of a baseline on both sides of the waveform of the particle;
   subtracting the mean value from data points of the waveform;
   determining a maximum value of the waveform;
   calculating a half maximum value by dividing the maximum value by two;
   subtracting the half maximum value from the data points of the waveform;
   obtaining absolute values for the data points to generate a folded waveform;
   determining a first minimum and a last minimum in the folded waveform;
   generating a first vector by performing linear regression on a first set of data points in proximity to the first minimum;
   generating a second vector by performing linear regression on a second set of data points in proximity to the last minimum; and
   measuring a direct pulse width value of the particle as a distance between the first and second vectors at the half maximum value.
28. The method of clause 27, further comprising:
   measuring an indirect pulse width value as a function of the maximum value of the waveform and an area of the waveform.
29. The method of clause 28, further comprising:
   characterizing the particle as a concatenated particle when a difference between the direct pulse width value and the indirect pulse width value exceeds a threshold.
30. The method of clause 29, further comprising:
   calculating the difference between the direct pulse width value and the indirect pulse width value by:
      subtracting the indirect pulse width value from the direct pulse width value;
      dividing by a sum of the direct and indirect pulse width values;
      obtaining an absolute value; and
      multiplying the absolute value by a coefficient.
31. The method of clauses 29 or 30, wherein the threshold is 0.1.
32. The method of clauses 29 or 30, wherein the threshold is 0.07.
33. The method of clauses 29 or 30, wherein the threshold is 0.03.

What is claimed is:
1. A method of characterizing particles in flow cytometry, the method comprising:
   determining a first pulse width value of a particle using a first technique;
   determining a second pulse width value of the particle using a second technique;
   comparing the first and second pulse width values; and
   characterizing the particle as a concatenated particle when a difference between the first and second pulse width values exceeds a threshold.
2. The method of claim 1, wherein the first technique includes directly measuring a pulse width of the particle, and the second technique includes indirectly measuring the pulse width.
3. The method of claim 2, wherein the first and second techniques each include:
   determining a mean value for a baseline on both sides of a waveform of the particle; and
   subtracting the mean value from data points of the waveform to set the baseline to zero.
4. The method of claim 3, wherein the first technique further includes:
   determining a maximum value of the waveform;
   calculating a half maximum value by dividing the maximum value by two;
   subtracting the half maximum value from the data points of the waveform; and
   obtaining absolute values for the data points to generate a folded waveform.
5. The method of claim 4, wherein the first technique further includes:
   determining a first minimum and a last minimum in the folded waveform;

selecting a first set of data points around the first minimum; and selecting a second set of data points around the last minimum.

6. The method of claim 5, wherein the first technique further includes:

generating a first vector by performing linear regression on the first set of data points;

generating a second vector by performing linear regression on the second set of data points; and determining the first pulse width value as a distance between the first and second vectors at the half maximum value.

7. The method as in claim 1, wherein the second technique further includes:

measuring the second pulse width value as a function of the maximum value of the waveform and an area of the waveform.

8. The method as in claim 1, wherein the difference between the first and second pulse width values is calculated by:

subtracting the second pulse width value from the first pulse width value;

dividing by a sum of the first and second pulse width values;

obtaining an absolute value; and multiplying the absolute value by a coefficient.

9. The method as in claim 1, wherein the threshold is 0.1.

10. The method as in claim 1, wherein the threshold is 0.07.

11. The method as in claim 1, wherein the threshold is 0.03.

12. The method as in claim 1, further comprising:

characterizing the particle as a singlet particle when the difference between the first and second pulse width values is equal to or less than the threshold.

13. The method as in claim 1, further comprising:

characterizing the particle as having a gaussian shape when the difference between the first and second pulse width values is equal to or less than the threshold.

14. The method as in claim 1, further comprising:

characterizing the particle as having a non-gaussian shape when the difference between the first and second pulse width values exceeds the threshold.

15. The method as in claim 1, further comprising:

sorting the particle into one or more groups based on the difference between the first and second pulse width values.

* * * * *